United States Patent [19]
Bovellan

[11] Patent Number: 5,810,426
[45] Date of Patent: Sep. 22, 1998

[54] ARRANGEMENT FOR ABSORBING VEHICLE COLLISION ENERGY

[75] Inventor: Kent Bovellan, Trollhättan, Sweden

[73] Assignee: SAAB Automobile Aktiebolag, Sweden

[21] Appl. No.: 419,914

[22] Filed: Apr. 11, 1995

[30] Foreign Application Priority Data

Apr. 12, 1994 [SE] Sweden ................................. 9401219

[51] Int. Cl.$^6$ ................................................. B62D 25/08
[52] U.S. Cl. ........................................ 296/189; 296/194
[58] Field of Search .................................. 296/188, 189, 296/194, 198, 203, 204, 205, 209

[56] References Cited

U.S. PATENT DOCUMENTS

| | | |
|---|---|---|
| 3,718,364 | 2/1973 | Fischer et al. . |
| 4,428,599 | 1/1984 | Jahnle . |
| 4,669,776 | 6/1987 | Harasaki ................................. 296/194 |
| 4,909,565 | 3/1990 | Harasaki et al. . |
| 5,118,160 | 6/1992 | Kitagawa et al. ...................... 296/189 |
| 5,244,248 | 9/1993 | Bovellan . |

FOREIGN PATENT DOCUMENTS

| | | |
|---|---|---|
| 2137517 | 2/1973 | Germany . |
| 404252781 | 9/1992 | Japan ..................................... 296/188 |

*Primary Examiner*—David M. Mitchell
*Attorney, Agent, or Firm*—Ostrolenk, Faber, Gerb & Soffen, LLP

[57] ABSTRACT

An arrangement for absorbing collision energy in a vehicle, preferably a passenger car, incorporating a framework and a forward portion with a wheel housing (24) on each side. A first elongated force-transmitting device (2) with a first end portion (2a), a second end portion (2b) and an intermediate portion (2c) which is arranged between these latter. The first end portion (2a) is connected to the framework and the second end portion (2b) is connected to a bumper element at the forward end of the vehicle. The intermediate portion (2c) extends past the pertinent wheel housing (24). The second end portion (2b) is at the same time designed with a greater width than the intermediate portion (2c) and covers the greater part of the width of the vehicle wheel arranged in the wheel housing (24).

12 Claims, 2 Drawing Sheets

ARRANGEMENT FOR ABSORBING VEHICLE COLLISION ENERGY

The invention relates to an arrangement for absorbing vehicle collision energy, preferably for a passenger car.

STATE OF THE ART

Manufacturers and authorities in various countries have made great endeavours to increase safety for occupants of vehicles on the occasion of collisions. Examples include such measures as the introduction of safety belts and collision cushions.

A number of standardized collision tests are also available for determining the "collision safety" of a vehicle. These tests are not entirely satisfactory, however, since they generally represent a type of collision which is not very frequent in real life, viz. a straight central collision with a stationary fixed barrier. The ordinary type of collision, in real life, however, is that which occurs between two vehicles which collide in an "offset" manner and/or at an angle to one another.

From the very first beginnings, collision safety has always been a very important factor to be catered for when developing a new design for a vehicle. At the present time, motorcars are almost without exception designed with a forward deformation zone intended to convert the kinetic energy which the vehicle has at the time of collision into deformation energy so that as little energy as possible is transmitted to the driver's space.

The fact that present-day collision tests do not correspond to the most frequent accidents in real life is one of the reasons why an important harmful factor has hitherto not been sufficiently taken into account, viz. the type of incident in which the vehicle's wheels damage or wreck the passenger compartment. The largest amount of kinetic energy in a moving vehicle is stored in its wheels. This stored energy constitutes a potential cause of harm. For example, if elements of the vehicle which are displaced during a collision impart to a front wheel a motion such that it strikes a sill box, this may lead to collapse of the whole beam structure which surrounds the passenger compartment, resulting in fatal consequences for the vehicle's occupants.

An example of a known front structure which seemed to afford good safety on the occasion of collisions is described in SE-B-9001186-7. In that design, when a collision occurs, the forward section of the front structure will become deformed first, followed by a multi-way division of the forces transmitted to the rigid body cage which forms the passenger compartment. The known design incorporates for each half of the vehicle an essentially horizontal beam which transmits forces and absorbs deformation energy and which during an initial phase of a collision process is arranged to buckle foldingly in its forward portion. This beam is connected in a force-dividing manner via a connecting portion to a superjacent beam and to a subframe by means of two obliquely positioned struts so as to cause a three-way division of force transmission to the framework. This principle of dividing the collision forces seemed very advantageous in practice, but it is nevertheless possible to improve protection with regard to preventing the transmission of vehicle wheel energy to the passenger compartment.

SUMMARY OF THE INVENTION

The object of the invention is to provide an arrangement for absorbing collision energy in vehicles which results in substantially improved protection against harm in the passenger compartment caused by vehicle front wheels. The design by which this is achieved has also to be easy to manufacture at an advantageous cost, while at the same time the structure has to be of relatively low weight. In addition, the design has to be relatively easy to repair after the occurrence of limited deformations.

The foregoing and other objects of the invention are achieved in accordance with the present invention by an arrangement which includes on each side of a central longitudinal vertical plane through the vehicle a first force-transmitting device which is arranged substantially horizontally in the longitudinal direction of the vehicle and has a rear end portion connected to the framework of the vehicle, a forward end portion and an intermediate end portion between the rear and forward end portions and situated adjacent to the respective vehicle wheel. The forward end portion is situated adjacent to the front end of the vehicle and has a width which is wider than the intermediate portion and covers substantially the entire width of the respective vehicle wheel.

The fact that the force-transmitting device has substantially the same width as, and at least almost covers, the vehicle wheel means that the wheel is protected behind that device so as to effectively prevent the imparting to the wheel during a collision of a motion which would cause the wheel to strike the passenger compartment.

This protection is particularly effective in "offset" and oblique collisions, in which the forces which occur during the deformation process are conducted alongside the wheel to the first end portion connected to the framework.

It is advantageous for the second end portion to have a substantially rectangular cross-section with greater width than height.

The invention is preferably used in a front structure with a three-way division of forces, in which, a strut positioned obliquely upwards and rearwards conducts part of the divided forces via the wheel housing to the framework, and a strut positioned obliquely downwards and rearwards diverts part of the forces away from the wheel housing into the framework.

Such an arrangement will result in the wheel being well protected behind a region which diverts forces directed towards the wheel away from it.

It is advantageous for the second end portion to be designed as a deformation zone with notches so that it buckles foldingly and thereby absorbs collision energy during the initial phase of a collision process.

BRIEF DESCRIPTION OF THE DRAWINGS

An embodiment of the invention is described below with reference to the attached drawings, in which.

DESCRIPTION OF EMBODIMENTS

Figure 1:
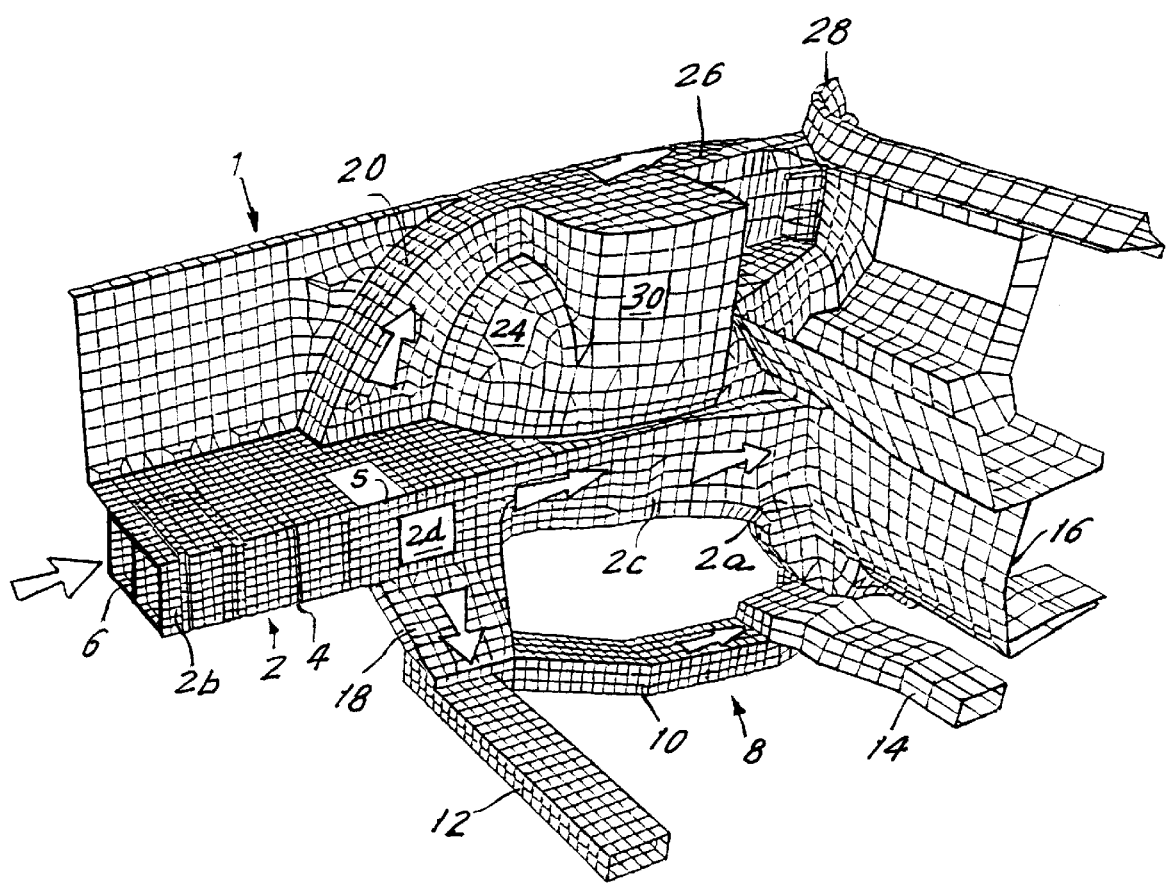
FIG. 1 shows schematically in perspective the right half of a front structure according to the invention, in which the structure is divided into finite elements for strength calculation.

FIG. 1 shows a section of the right side of a front structure 1, cut away in the central plane, of a passenger car according to the invention. The thick arrows depicted show a computer-calculated division of the mean force during the first 30 ms of a collision process. The front structure on the left side of the vehicle is in principle of the same design as on the right, and any deviations from absolute symmetry which may arise are due to necessary adaptations to the design of the engine and transmission. Since the left side is in principle of the same construction as the right, the description given below of the right side applies to the left side as well. There will therefore be no further mention hereinafter of the left side.

The invention is applied here to a front structure with three-way division of the force which is transmitted to a body framework which surrounds the vehicle passenger compartment. For the sake of clarity, the forward portion (the bumper and its fastening elements) of the structure is omitted.

The force-absorbing structure is constructed as follows:

On each side of a central longitudinal vertical plane of the vehicle, a first force-transmitting device, which is arranged substantially horizontally in the longitudinal direction of the vehicle and is hereinafter called the side beam 2, extends adjacent to the pertinent side of the vehicle. The construction and positioning of the side beam 2 are described in more detail below.

A subframe 8 is arranged in the lower part of an engine compartment in order to support the vehicle drive unit, of which there is no further depiction. The subframe 8 consists of a pair of subframe beams 10 each arranged on its side of the vehicle centre plane. The two subframe beams 10 are connected to a forward crossbeam 12 and a rear crossbeam 14. The rear end of each subframe beam 10 is fixed in loadbearing elements of the cowl panel 16 which form part of the framework supporting the vehicle passenger compartment. A third force-transmitting device directed downwards, hereinafter called the strut 18, is connected to a connecting portion 2d of the sidebeam 2 and leads down into the subframe beam 10 part of the force engendered in the side beam 2 during a collision process, which force is then led on to loadbearing elements of the cowl 16 and thereby to other elements of the framework. The strut 18 may of course be connected directly to the framework instead of being indirectly connected as in this embodiment.

Figure 2:
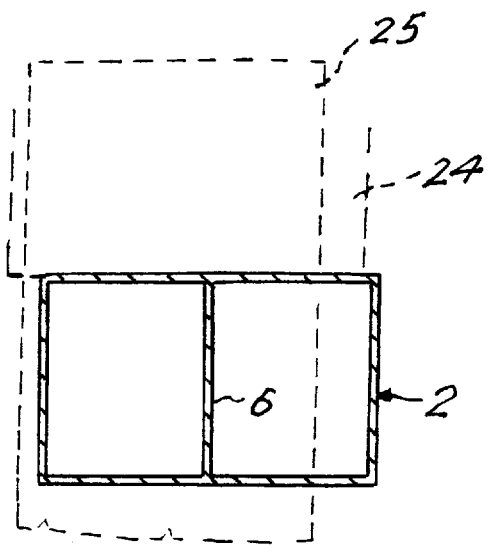
FIG. 2 shows a cross-section through the elongated second end portion of the force-absorbing device, with the vehicle wheel housing and wheel represented by broken lines.

A second force-transmitting device directed rearwards and upwards, hereinafter called the strut 20, is rigidly connected at one end to the side beam 2 just forward of a wheel housing 24 which, as seen in FIG. 2, partly surrounds a vehicle wheel 25. The strut 20 extends in front of the wheel housing 24 up to an upper connecting beam 26 which is situated above the side beam 2 and which is in its turn positively connected to a windscreen beam 28 which also forms part of the framework. Another part of the force which occurs in the side beam 2 is thus led into the framework via the rearward-directed strut 20. The strut 20, as in the case of the strut 18, may of course be directly connected to the framework instead of being indirectly connected as in this embodiment.

The remainder of the force is finally transmitted via the side beam 2, the rear end portion 2a of which is connected to one of the undepicted floor beams of the vehicle.

The side beam 2, which is preferably but not necessarily situated at the same level as the wheel centre, exhibits a forward end portion 2b. This section is in a conventional manner provided with notches 4 (creases) so that during the initial stages of a collision process it buckles foldingly in a controlled manner with maximum possible deformation absorption.

The forward end portion 2b of the side beam 2 extends axially adjacent to the vehicle side wing and has substantially the same width from the forward end of the vehicle to the wheel housing 24 whereby this portion 2b, as seen in projection from above, at least almost covers the whole width of the vehicle wheel (see FIG. 2 for wheel housing and wheel depicted by broken lines). In one embodiment, the forward end portion 2b covers at least half the wheel width. The forward end portion 2b is connected at the front in a conventional manner to a bumper element (not depicted), which advantageously takes the form of a transverse bumper beam which extends in a transverse direction between the side beams 2 arranged on either side. This wide deformation portion 2b is followed by a connecting portion 2d which is substantially more rigid than the deformation portion 2b. The struts 18 and 20 are connected to this connecting portion 2d. The purpose of this arrangement is that during a collision process the forward portion 2b should undergo maximum deformation against the more rigid connecting portion 2d before succeeding elements of the front structure become deformed. The connecting portion 2d is followed by the intermediate portion 2c of the side beam 2, which extends along the wheel housing 24 and a spring unit cover 30 integrated with the latter. This portion is more rigid for absorbing collision forces than the forward end portion 2b but significantly weaker than the connecting portion 2d, and it is also considerably narrower in the transverse direction of the vehicle than the forward end portion 2b. The side beam 2 is connected to one of the vehicle floor beams via a stronger rear end portion 2a which is more rigid than the intermediate portion 2c.

On the occasion of a collision, the forward end portion 2b will become deformed first by buckling foldingly with a substantial absorption of deformation energy. This is followed by a division in the connecting portion 2d of the force in the side beam 2 into the struts 18, 20 and into the intermediate portion 2c of the side beam. The force is thus divided among more rigid elements which form a sort of "cage" around the wheel so as to prevent the wheel from being struck by elements which may cause displacement of it to the adjoining body framework.

For optimum force distribution and force conduction, at least one longitudinal edge 5 of the side beam 2 is substantially straight, particularly in the weaker portion 2b. The result is an intended substantially axial deformation in this section with an optimum force pattern.

Figure 3:
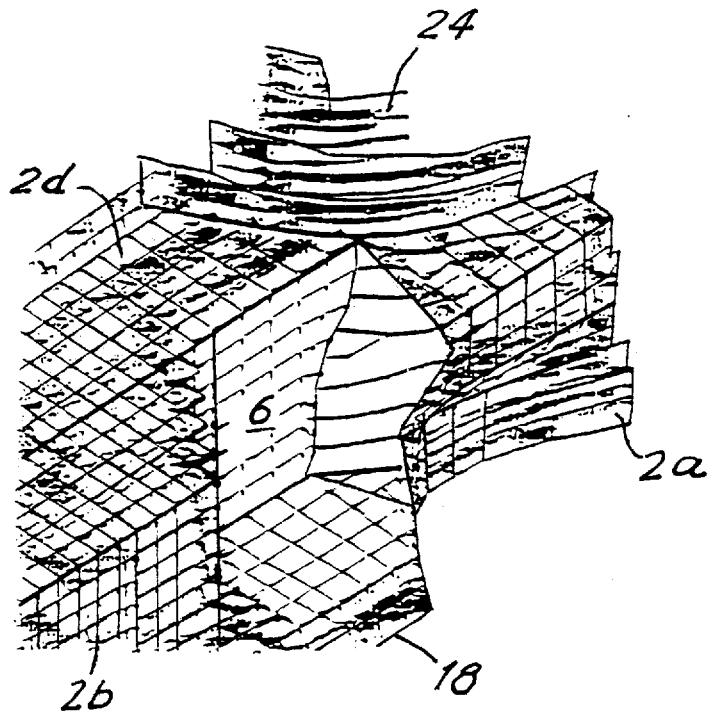
FIG. 3 shows in perspective on a larger scale a cutaway view of the transition region to the vehicle wheel housing.

The cross-section depicted in FIG. 2 through the forward end portion 2b of the side beam 2 shows that the deformation zone 2b takes the form of a rectangular hollow profile the width of which is considerably greater than the height. This is in sharp contrast with the traditional design of deformation beams in which the height is usually greater than the width. To further improve the deformation absorption characteristics of the front structure, the hollow profile is provided with an intermediate wall 6 which extends substantially in a vertical plane in the longitudinal direction of the vehicle and which preferably meets the wheel housing 24 at a right or obtuse angle, as depicted in FIG. 3. The intermediate wall 6, which extends in the forward end portion 2b to the wheel housing to which it is connected, stiffens the deformation section 2b in the transverse direction so as to counteract any non axial deformation. The second and third force-transmitting devices or struts 20 and 18 respectively are connected on each side of the intermediate wall 6 and arranged substantially centrally with respect to one another. It is advantageous but not necessary for the intermediate wall 6 to have the same thickness as the material of the end portion 2b and it is advantageous but not necessary for it to be positioned centrally in the side beam 2.

The fact that the deformation zone is made so wide and is situated so near to the side of the vehicle as to cover at least almost the vehicle wheel width results in the following advantages compared with previous front structures:

"Offset" and oblique collisions are coped with in a significantly more advantageous manner than previously. The problem that on such occasions the vehicle wheel may give rise to serious damage to the body framework is now solved in that the wheel is protected by the front structure. Despite these substantial improvements in collision characteristics, there is no need for any appreciable increase in weight relative to comparable front structures. Strength calculations indicate considerably better energy absorption with the same weight as front structures according to the state of the art.

Extensive calculations have been carried out for the front structure according to the invention. It results in very good collision characteristics in all load cases, particularly as regards oblique or offset collisions, and there has been found to be 65% better energy absorption during the first 25 ms than in a body with conventional front structure. The good results are attributable to the following principles.

A wide zone absorbs offset collisions.

A collision-absorbing zone arranged along the side of the vehicle results in the wheel being protected.

The invention may of course be varied in many different ways. Thus it may also be applied to other front structures than those where there is a three-way division of force. The most important principle is that the vehicle is protected behind a force-transmitting device with a wider portion which substantially covers the width of the vehicle wheel and whereby the force is diverted alongside the wheel housing in a narrow intermediate portion before finally being led into the vehicle framework.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. An arrangement for absorbing collision energy in a vehicle having a body framework which surrounds a passenger compartment and respective vehicle wheels arranged on each side of a central longitudinal vertical plane through the vehicle, the wheels being partly surrounded by respective wheel housings, which arrangement on each side of the longitudinal vertical plane comprises:

a first force-transmitting device which is arranged substantially horizontally in the longitudinal direction of the vehicle and has a rear end portion, a forward end portion and an intermediate portion between the rear and forward end portions and situated adjacent to the respective vehicle wheel, the rear end portion being connected to the framework and the forward end portion being situated adjacent to a front end of the vehicle and being wider than the intermediate portion and covering at least half the width of the respective vehicle wheel.

2. An arrangement according to claim 1, wherein the forward end portion has substantially the same width from the front end of the vehicle to the respective wheel housing and covers substantially the entire width of the respective vehicle wheel.

3. An arrangement according to claim 1, wherein the forward end portion has a substantially rectangular cross-section with a width which is greater than its height.

4. An arrangement according to claim 2, wherein the forward end portion has a substantially rectangular cross-section with a width which is greater than its height.

5. An arrangement according to claim 4, wherein the forward end portion is hollow and includes an internal wall.

6. An arrangement according to claim 5, wherein the internal wall extends longitudinally from the front end of the vehicle to the respective wheel housing.

7. An arrangement according to claim 6, wherein the internal wall extends in a vertical plane and is connected to the respective wheel housing.

8. An arrangement according to claim 1, wherein second and third force-transmitting devices are each connected both to the first force-transmitting device and to the framework so as to create a three-way division of any forces which are transmitted to the framework as a result of a collision of the vehicle.

9. An arrangement according to claim 7, wherein second and third force-transmitting devices are each connected both to the first force-transmitting device and to the framework so as to create a three-way division of any forces which are transmitted to the framework as a result of a collision of the vehicle.

10. An arrangement according to claim 9, wherein the second and third force-transmitting devices are each connected to the first force-transmitting device on opposite sides of the internal wall such that the connections of the second and third force-transmitting devices are substantially opposite one another.

11. An arrangement according to claim 10, wherein the second force-transmitting device comprises a first strut positioned obliquely upwards and backwards from the first force-transmitting device and force-transmittingly connected to the framework, and the third force-transmitting device comprises a second strut obliquely positioned downwards and rearwards from the first force-transmitting device and force-transmittingly connected to the framework, the first and second struts being connected to the first force-transmitting device at a stable and rigid connection portion thereof.

12. An arrangement according to claim 11, wherein the connecting portion is situated between the forward and rear end portions, and the forward end portion includes notches so that during a collision the forward end portion buckles foldingly while absorbing collision energy.

* * * * *